May 7, 1929.  A. AGRAMONTE  1,712,063
VEHICLE SUSPENSION
Filed July 16, 1927
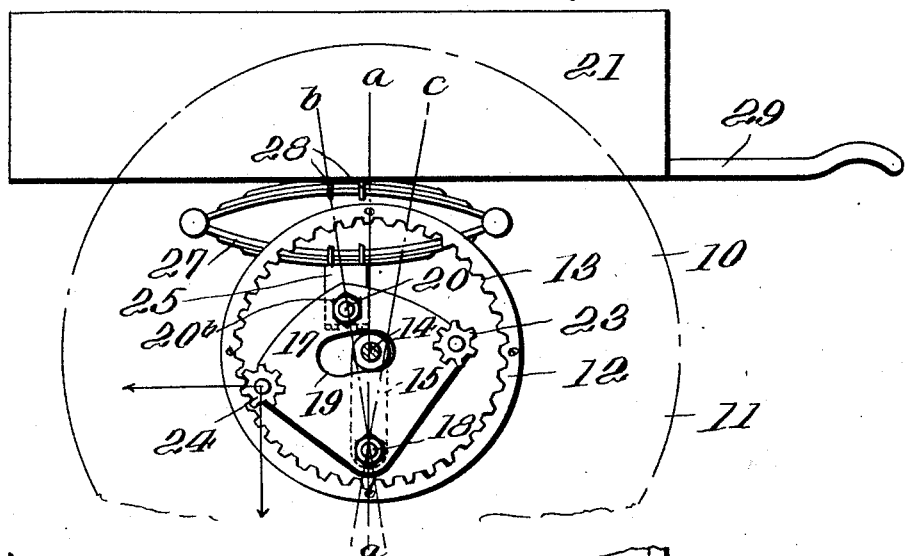
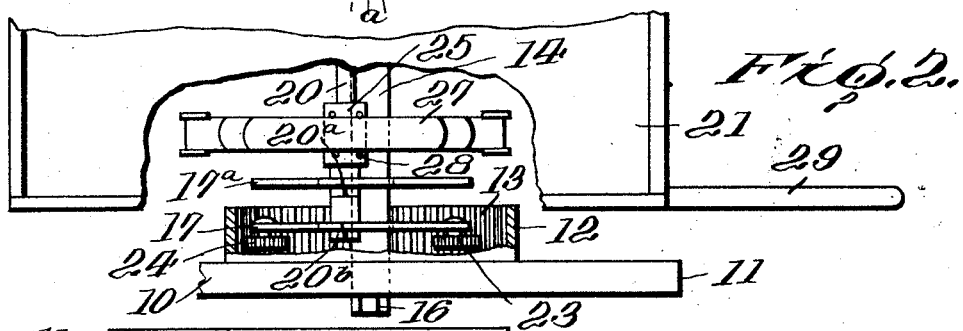
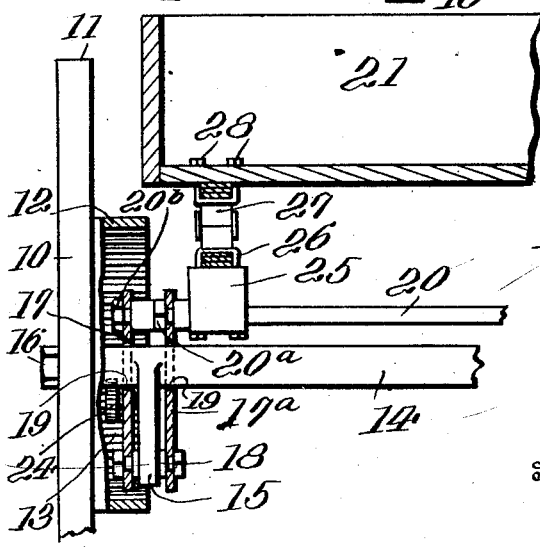
Inventor
Albert Agramonte,
By Sturtevant & Mason,
Attorneys.

Patented May 7, 1929.

1,712,063

UNITED STATES PATENT OFFICE.

ALBERT AGRAMONTE, OF CAMAGUEY, CUBA.

VEHICLE SUSPENSION.

Application filed July 16, 1927. Serial No. 206,249.

The present invention relates to improvements in vehicle suspensions, and more particularly applies to suspensions of a type wherein the driving effort is applied at a point of the vehicle wheel removed from the vertical plane through its axis.

One of the objects of this invention is by such a construction to facilitate the movement of the vehicle and its braking, while conserving the force to be expended.

Another object is to provide such a system of simple form and inexpensive construction and with very few parts.

The invention has been illustrated on the accompanying drawing, in which:

Figure 1 is a side elevation of a cart, with the wheels broken away to show the suspension system of the present type.

Fig. 2 is a plan view of one side of this cart with its associated wheel and mechanism.

Fig. 3 is a sectional view substantially on line 3—3 of Fig. 2.

The suspension system relates to the supporting of a load receiving body upon a wheel or wheels, and is applicable to wheelbarrows, to wheel carts or tricycle carts, and to vehicles having four or more wheels, whether propelled by hand or other external energy or as trailers or driven by a self-contained source of power. The system comprises briefly a rocking system which is fulcrumed from a depending bracket on the wheel axle and has the load receiving body pivoted at its oscillating upper end. This system is provided with contact rollers which engage with the inner surface of a drum on the wheel at the end of the oscillation, and by couples of forces produce a relative downward thrust upon the wheel at the point of such engagement, when the vehicle is being moved, whereby the movement of the vehicle and its wheels is facilitated.

The rocking system may be of any appropriate type, rigid or elastic, and will be illustrated as being rigid, i. e., the rolls are not resiliently supported.

In the form of execution illustrated in Figs. 1 to 3, a two-wheeled cart is shown with vehicle wheels 10 each having the tread surface 11 and a drum 12 with a cylindrical internal surface located on the side of the wheel adjacent the vehicle body. In the form of Figs. 1 to 3, this surface has internal teeth 13. The wheel is mounted upon the end of the axle 14 for loose rotation thereon. This axle has a rigid and integral downwardly extending bracket 15 at each end, although for simplicity but one end has been illustrated in Fig. 3. A hub nut 16 or the like is provided to secure the wheel 10 in permanent position at the end of the axle. The rocking plates 17, 17ª are pivotally mounted on a projecting bolt 18 of the bracket 15, the axis of this bolt being located at all times beneath the axis of the axle 14. The plates 17, 17ª extend upwardly and have arcuate slots 19 concentric with the pivot 18 whereby the plates are enabled to fit over the end of the axle 14 and which serve to limit the movement of the rocking plates. At the upper end, the rocking plates 17, 17ª are connected together by a bolt 20 which extends across beneath the cart body 21, and is connected at the opposite side to the corresponding rocking plates (not shown) so that the rocking plates are supported rigidly for simultaneous movement. The bolt 20 has a large central portion with successively reduced ends, so that successive shoulders are formed to support and space apart the plates 17, 17ª at each side of the cart: the nuts 20, 20ᵇ being provided to hold the assembly together.

The rocking plate 17 is made of lesser width than the diameter of the internal surface of the drum 12, and is mounted within the drum (Fig. 1). It has freely journaled at its sides the rollers 23, 24 which alternately come into contact with this cylindrical internal surface of the drum 12 during the rocking of the plate, and for such purpose they are shown as provided with teeth which mesh with the teeth 13 of the drum 12.

The pivoting clips 25 are mounted to swing with respect to the bolt 20 and have the U-bolts 26 to secure the lower portion of the elliptical springs 27. The upper portions of these springs are fixed to the bottom of the cart body 21 as by bolts 28. The cart is provided with the handles 29 for pushing or pulling it.

It will be understood that the ratio of the relative diameter of the wheel 10 and of the drum 12 has been exaggerated in the illustration, for greater clearness: and that ordinarily the drum will be relatively much smaller, and the rocking system including the rocking plate 17 will move through small angles past either side of the vertical.

The method of operation of the suspension is as follows: When the cart is at its standstill the body and its elements are located in one end position or the other of the rocking plates 17, 17ª with respect to the vertical axial plane *a—a* of the axle 14 of the vehicle. The plane passing through the bolts 18 and the spacing bolt 20 therefore may be in either position represented by *b* or *c* on Fig. 1, it being understood that this position has been exaggerated on the drawing for greater clearness. When the body 21 is pushed by the handles 29, the body through the elliptical springs 27 exerts a thrust directly forward on the pivot bolt 20, and thence against the rocking plates 17, 17ª by which the rollers 24 are brought into engagement with the inner surface of the drum 12, if not already there. The rocking plates 17ª, 17ª being pivoted at 18, a couple of forces is produced which results in a downward and forward thrust upon the drum 12 at the point of contact of the roller 24, with resultants forwardly in the direction of movement of the vehicle and downwardly from this point of contact. This downward movement against the drum 12 is communicated thereby to the wheel 10, and since it is in a plane forwardly of the vertical plane *a—a* through the vehicle axle 14, a force is brought to bear upon the wheel to assist it in its forward movement. The bracket 15 may rock slightly rearwardly: but owing to the relative separations of the axle 14 and of the bolt 20 from the axis of bolt 18, this movement is relatively small, and can be substantially calculated.

The thrust at the handles 29 is thus transmitted through the body and spring to the rocking plates and thence to the wheels and thus produce the forward movement of the vehicle.

When the vehicle is in motion and it is desired to stop it, the handles 29 are pulled backwardly until the rocking plates 17, 17ª are dragged from their forward position represented by *b* into their rearward position represented by *c*, and now the rollers 23 are in contact with the inner surface of the drum 12, and a downward movement is exerted upon this drum in a plane again removed from the vertical plane *a—a*, but this time to the rear of it, by which the weight of the body and its contents are caused to assist the checking or braking the forward movement: and the vehicle is brought to a standstill.

If it be desired to pull the vehicle by the handles 29, the action is substantially the same, but in this case the movement is produced by the rollers 23 acting upon the inner surface of the drum 12: and the braking is produced by the rollers 24 acting upon this drum.

The several rocking plates 17, 17ª, and the bolt 20 form a rigid assembly which is pivoted at each side of the vehicle on a bolt 18. This assembly therefore rocks relatively to the axle 14 in such manner that the bolt 20 at all times remains parallel to this axle. The clips 25 are located adjacent the rocking plates 17ª at each side of the vehicle, and the elliptical springs 27 are self-aligning and are secured to the body 21. The body is therefore supported against "weaving" or rocking from side to side with respect to a given point on the axle 14.

It will be understood that while the illustrative form describes the application of the invention to a hand cart having two wheels, one at each side, and in connection with a spring mounting and rigid rocking plates which have lateral stability to support the body with respect to the axle 14, the invention is not limited solely to such illustrative employment, but may be modified in many ways within the scope of the appended claims.

What is claimed as new is:

1. In a suspension system for a vehicle having a body and a wheel, a transverse axle on which said wheel is rotatable, a depending bracket on said axle, a rocking plate pivoted to said bracket and to said body, a drum on said wheel, and a roller pivoted on said rocking plate and adapted to be brought into contact with said drums by a rocking of said plate with respect to said body and wheel.

2. In a suspension system for a vehicle having a body and wheels, a transverse axle on which said wheels are rotatable, depending brackets on said axle, rocking plates pivoted to said brackets and to said body, said plates having slots therein to receive said axle and to limit the relative movement between said plates and axle, a drum on each of said wheels, and a roller pivoted on said rocking plates and brought into contact with said drums by a rocking of said plate with respect to said body and wheels.

3. In a suspension for a vehicle having a body and a wheel presenting an external tread surface and a cylindrical internal surface, an axle for said wheel supported thereby, a depending bracket carried on said axle, a rocking plate pivoted to said bracket at a point below said axle, a pivot connection between said rocking plate and said body whereby said rocking plate may move about said bracket pivot as the body moves relative to said wheel, and a roller journaled on said plate and moved therewith during such rocking into engagement with said internal surface.

4. In a vehicle, a wheel presenting a tread surface and a cylindrical internal surface, an axle for said wheel and supported thereby at an invariable distance from the roadway, a bracket suspended from said axle, a rocking plate pivoted to said bracket at a point below said axle, said plate having a slot therein to accommodate said axle and permit rocking of said plate, rollers journalled on said plate and adapted during the rocking movements of the latter to be alternately and respectively brought into contact with said internal surface whereby to exert a downward thrust thereon at a line removed from the vertical plane of the wheel axis to advance said wheel in the respective direction, a vehicle body and a pivotal connection between the upper end of said plate and said body whereby the plate is rocked upon a movement of the body in the desired direction.

5. In a suspension system for a vehicle having a body and wheels, an axle on which said wheels are rotatable, depending brackets on said axle near each end thereof, a rocking system including spaced pairs of rocker plates at the sides of the vehicle, said rocker plates of each pair being located at respective sides of the respective brackets, pivots at the lower ends of said brackets to support said rocker plates, a transverse member connecting the upper ends of said plates, and a pivotal connection between said body and said transverse member.

6. In a suspension system for a vehicle having a body and a wheel, an axle on which said wheel is rotatable, a depending bracket on said axle, a rocking plate pivoted to the said bracket below said axle, an elliptical spring pivoted at one bow to said rocking plate, and means to hold said spring by its other bow rigidly to said body.

7. In a suspension system for a vehicle having a body and a road wheel, an axle for said wheel, a drum fixed on said wheel, and means for controlling the rotation of the wheel in accordance with the movement of the body, said means including a device fulcrumed rockably from said axle about a pivot parallel to and below the wheel axis and engaging with said drum at the ends of its rocking movements, so that upon movement of the body relative to the wheel in either direction the said device rocks to apply a downward thrust to said drum at a point removed horizontally relative to said axis in the direction of the movement of the body, whereby the vehicle is set in movement if at a standstill or braked if moving in the opposite direction.

In testimony whereof, I affix my signature.

ALBERT AGRAMONTE.